United States Patent
Morita et al.

[15] 3,655,946
[45] Apr. 11, 1972

[54] SYSTEM FOR DISPOSING OF INVALID CARDS IN A CREDIT CARD SYSTEM OR THE LIKE

[72] Inventors: Tadao Morita; Masanori Nagata, both of C/o Omron Toteisi Electronics Co. 20, Igadera Shimokaiinji, Kyoto, Japan

[22] Filed: Sept. 2, 1970

[21] Appl. No.: 68,840

[30] Foreign Application Priority Data

Sept. 11, 1969 Japan..................................44/72138

[52] U.S. Cl. ................235/61.7 B, 235/61.11 D, 340/149 A
[51] Int. Cl............................................................G06r 5/00
[58] Field of Search....................340/149, 149 A, 152, 365; 235/61.7, 61.7 B, 61.11, 61.11 E

[56] References Cited

UNITED STATES PATENTS

| | | | |
|---|---|---|---|
| 3,254,201 | 5/1966 | Miller | 235/61.7 B |
| 3,353,006 | 11/1967 | Pollock et al. | 235/61.11 |
| 3,559,175 | 1/1971 | Pomeroy | 340/149 A |
| 3,221,304 | 11/1965 | Enikeieff et al. | 340/365 |

*Primary Examiner*—Thomas A. Robinson
*Attorney*—Christensen, Sanborn & Matthews

[57] ABSTRACT

A system for disposing of invalid cards in a credit card system or the like, wherein the identification numbers of those of the cards issued which have become invalid are recorded in the system, so that if the identification number of a card presented to the system agrees with any one of the recorded invalid card numbers, that card is recognized as invalid and the identification number written on the card is erased therefrom and at the same time the corresponding number is removed from the record in the system.

1 Claims, 1 Drawing Figure

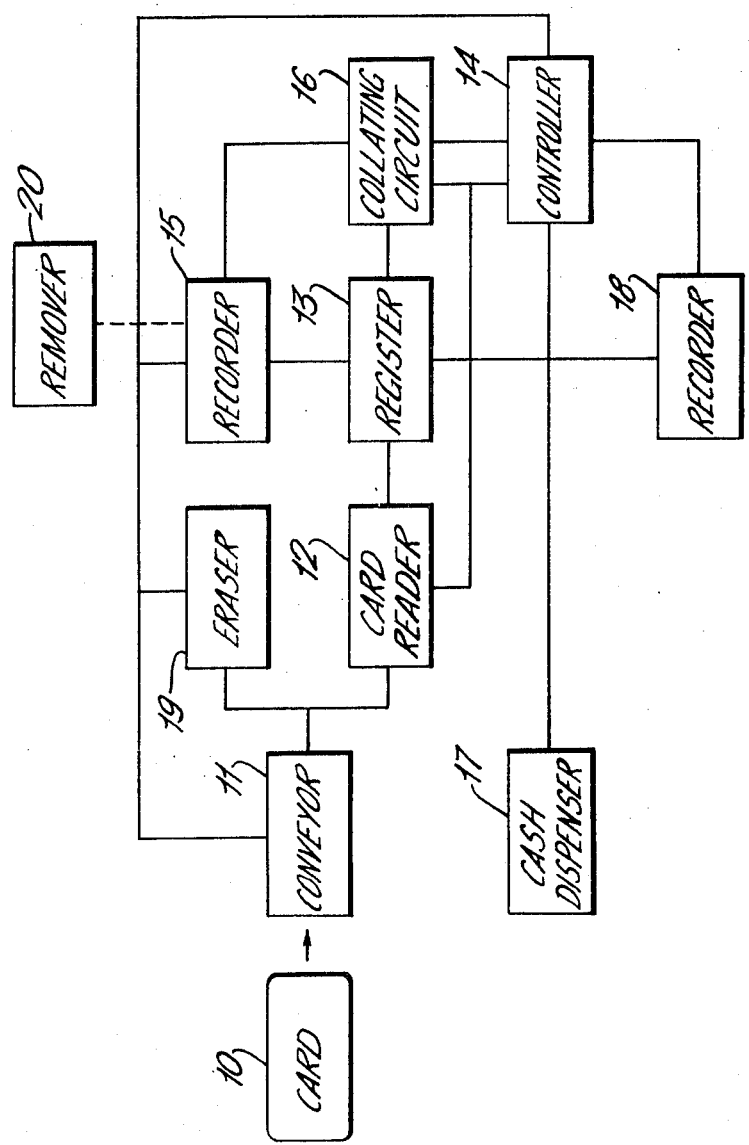

SYSTEM FOR DISPOSING OF INVALID CARDS IN A CREDIT CARD SYSTEM OR THE LIKE

This invention relates to a system for disposing of those of the cards used in a credit card system or the like which have become invalid.

At present credit cards are in wide use at banks, stores and the like establishments for depositing or withdrawing money or purchasing articles or services. Generally, credit cards have recorded thereon various information or data, by which the validity of the cards is tested when they are used in the system, so that the system operates to perform required actions in response to valid cards alone. To test the validity of cards, the system is generally provided with means for recording the identification numbers of those of the cards issued which have been invalidated, so that the identification number of a card used is collated with each of the recorded invalid card numbers to see if they agree. With this arrangement, if a card is stolen or lost, its identification number is newly recorded in the system as an invalid card number. In the prior art system, however, once recorded as invalid, the card numbers must be kept in the record so long as the system exists, and it is impossible to predict how many cards will become invalid, so that the recording means must have a great ability to record or store the increasing number of invalid card numbers. In other words, there must be a large space in the machine to accommodate the increasing number of recording elements for recording the increasing number of invalid card numbers. This is very inconvenient and uneconomical.

Accordingly, it is one object of the invention to provide a system for disposing of invalid cards in a credit card system or the like, wherein it is not necessary to record the identification numbers of invalid cards for ever.

Another object of the invention is to provide a system for disposing of invalid cards in a credit card system or the like, wherein the identification number of an invalid card previously recorded in the system can be removed therefrom once the invalid card has been used.

Another object of the invention is to provide a system for disposing of invalid cards in a credit card system or the like, wherein when a card the identification number of which is recorded as an invalid number has been used in the system, the identification number written on that card is erased therefrom so that the card cannot be used again, and at the same time the identification number of that card is recorded so that the corresponding invalid identification number recorded in the system may be removed therefrom.

In one embodiment of the invention, when a card has been stolen or lost, the identification number of the card is recorded as an invalid card number in a recording means provided in the system. When a card is used, its identification number is collated with each of the invalid card numbers recorded in the system. If the identification number of the card used is found to agree with any one of the recorded invalid card numbers, that number is erased from on the card so that the card can no longer be properly used in the system again. The card may be returned to the owner or collected into the machine. Since the card cannot be used any longer, it is not necessary to maintain the record of the identification number of that card any longer. Therefore, the record is removed from the recording means. Thus, the recording means for invalid card numbers need not have a very large capacity.

The invention, with the above and other objects, features and advantages, will become more apparent from the following description with reference to the drawing showing a block diagram of one embodiment of the invention.

A card 10 presented to the system is conveyed by a suitable conveyor 11 to a predetermined position. As it is being conveyed, the identification number of the card is read by a card reader 12 and the card number read is stored in a register 13. These operations are controlled by a controller 14. The card 10 is made of a suitable plastic material having necessary information written or recorded thereon. The card is provided with a magnetic film on which the identification number of the card and other necessary information are recorded by a suitable code.

If a card is lost or stolen, the identification number of that card is recorded as an invalid card number in a recorder 15. The recorder 15 comprises a magnetic drum or a diode matrix circuit. The identification number of the card stored in the register 13 is collated by a collating circuit 16 with each and every one of the invalid card numbers as previously recorded in the recorder 15. If the card number in the register 13 does not agree with any one of the invalid card numbers recorded in the recorder 15, the card is recognized as a valid card, so that a cash dispenser 17 dispenses a required amount of money. These operations are also controlled by the controller 14. On the contrary, if the card number in the register 13, that is, the identification number of the card used coincides with any one of the invalid card numbers in the recorder 15, the card is determined as invalid, so that the cash dispenser 17 does not operate. Instead, a recorder 18 records the identification number of that invalid card stored in the register 13. The recorder may comprise a tape punch, a printer or a computer. At the same time an eraser 19 operates to magnetically erase the identification number written on the invalid card, and the conveyor 11 operates to return the card to its owner or collect it into the machine so as not to be returned. The invalid card the identification number of which has thus been erased will no longer be able to operate the cash dispenser 17 even if it is used in the system. Therefore, that one of the invalid card numbers recorded in the recorder 15 which corresponds to the card number recorded in the recorder 18 is removed from the recorder 15. This is effected automatically by means of a remover 20, or manually by an operator on the basis of the record by the recorder 18. Thus, in accordance with the invention, once an invalid card has been used, the identification number of that card need not be kept in the recorder 15 any longer, so that it is removed therefrom, with a resulting decrease in the number of invalid card numbers to be recorded therein. This means that the recorder 15 need not have a very large capacity.

In the above embodiment the invention has been applied to a cash dispensing system. However, it is applicable to any other system which employs similar cards.

What we claim is:

1. A system for disposing of invalid cards in a credit card system or the like, comprising: first means for recording the identification numbers of those of all the cards issued which have become invalid; means for reading the identification number of a card presented; means for collating the identification number of said presented card with each of said recorded invalid identification numbers; means for treating said presented card so as not to be useable any longer when the identification number of said presented card agrees with one of said recorded invalid identification number; second means for recording the identification number of said presented card; and means for removing the record of the identification number of said presented card from said first recording means.

* * * * *

UNITED STATES PATENT OFFICE
CERTIFICATE OF CORRECTION

Patent No. 3,655,946        Dated April 11, 1972

Inventor(s) Tadao Morita and Masanori Nagata

It is certified that error appears in the above-identified patent and that said Letters Patent are hereby corrected as shown below:

The above-identified patent is assigned to

Omron Tateisi Electronics Co. of Kyoto, Japan.

Signed and sealed this 1st day of August 1972.

(SEAL)
Attest:

EDWARD M. FLETCHER, JR.      ROBERT GOTTSCHALK
Attesting Officer              Commissioner of Patents